(12) United States Patent
Guo et al.

(10) Patent No.: US 12,014,267 B2
(45) Date of Patent: Jun. 18, 2024

(54) SYSTEMS AND METHODS FOR SEQUENTIAL EVENT PREDICTION WITH NOISE-CONTRASTIVE ESTIMATION FOR MARKED TEMPORAL POINT PROCESS

(71) Applicants: Ruocheng Guo, Tempe, AZ (US); Jundong Li, Tempe, AZ (US); Huan Liu, Tempe, AZ (US)

(72) Inventors: Ruocheng Guo, Tempe, AZ (US); Jundong Li, Tempe, AZ (US); Huan Liu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 1087 days.

(21) Appl. No.: 16/511,505

(22) Filed: Jul. 15, 2019

(65) Prior Publication Data

US 2020/0019840 A1 Jan. 16, 2020

Related U.S. Application Data

(60) Provisional application No. 62/697,880, filed on Jul. 13, 2018.

(51) Int. Cl.
*G06N 3/08* (2023.01)
*G06N 3/044* (2023.01)
(52) U.S. Cl.
CPC ............. *G06N 3/08* (2013.01); *G06N 3/044* (2023.01)

(58) Field of Classification Search
CPC .................. G06N 3/08; G06N 3/044
See application file for complete search history.

(56) References Cited

U.S. PATENT DOCUMENTS

| | | | | |
|---|---|---|---|---|
| 4,914,603 A | * | 4/1990 | Wood | G06N 3/08 706/25 |
| 5,103,431 A | * | 4/1992 | Freeman | G01S 7/539 367/901 |
| 7,313,550 B2 | * | 12/2007 | Kulkarni | G06N 3/086 706/21 |
| 9,544,381 B2 | | 1/2017 | Zafarani et al. | |
| 10,002,322 B1 | * | 6/2018 | Ravindran | G06Q 30/02 |
| 10,072,924 B2 | * | 9/2018 | Boyle | G01B 11/16 |
| 10,529,317 B2 | * | 1/2020 | Lee | G10L 15/16 |
| 10,664,764 B2 | | 5/2020 | Gundecha et al. | |
| 11,256,982 B2 | * | 2/2022 | Audhkhasi | G06N 7/01 |

(Continued)

FOREIGN PATENT DOCUMENTS

| CN | 107679531 A | * | 2/2018 | ......... G06K 9/00771 |
|---|---|---|---|---|
| CN | 108062978 A | * | 5/2018 | ............. G06N 20/00 |

(Continued)

OTHER PUBLICATIONS

MIT 6.02 Draft Lecture Notes, Lecture 4 Noise, published on Sep. 26, 2010 at http://web.mit.edu/6.02/www/f2010/handouts/lectures/L4-notes.pdf, retrieved Feb. 9, 2023. (Year: 2010).*

(Continued)

*Primary Examiner* — Shourjo Dasgupta
(74) *Attorney, Agent, or Firm* — POLSINELLI PC (57) ABSTRACT

Embodiments for systems and methods of sequential event prediction with noise-contrastive estimation for marked temporal point process are disclosed.

15 Claims, 6 Drawing Sheets

(56) References Cited

U.S. PATENT DOCUMENTS

| | | | | |
|---|---|---|---|---|
| 11,340,602 | B2* | 5/2022 | Giering | G06N 3/045 |
| 11,586,925 | B2* | 2/2023 | Chang | G06F 18/10 |
| 2003/0040123 | A1* | 2/2003 | Hastings | H01J 49/0036 436/173 |
| 2003/0065409 | A1* | 4/2003 | Raeth | G08B 31/00 700/28 |
| 2006/0080040 | A1* | 4/2006 | Garczarek | H01J 49/0027 702/19 |
| 2006/0147101 | A1* | 7/2006 | Zhang | G06T 7/181 382/131 |
| 2007/0250274 | A1* | 10/2007 | Volkov | G01N 21/6456 702/22 |
| 2007/0250461 | A1* | 10/2007 | Sabe | G06N 20/00 706/12 |
| 2009/0073440 | A1* | 3/2009 | Tiemeyer | G01N 21/9501 702/58 |
| 2009/0150208 | A1* | 6/2009 | Rhodes | G06Q 10/087 705/28 |
| 2011/0313548 | A1* | 12/2011 | Taylor | G06F 16/9535 700/47 |
| 2012/0191640 | A1* | 7/2012 | Ebadollahi | G06N 20/00 706/53 |
| 2015/0254328 | A1* | 9/2015 | Dereszynski | G06Q 30/0277 707/739 |
| 2016/0335534 | A1* | 11/2016 | Nere | G06N 3/044 |
| 2017/0052960 | A1* | 2/2017 | Alizadeh-Shabdiz | G06F 16/285 |
| 2017/0061246 | A1* | 3/2017 | Chen | G06F 18/28 |
| 2017/0076152 | A1* | 3/2017 | Asl | G06V 30/226 |
| 2017/0212943 | A1 | 7/2017 | Li et al. | |
| 2017/0213153 | A1 | 7/2017 | Wang et al. | |
| 2017/0249534 | A1* | 8/2017 | Townsend | G06V 10/82 |
| 2017/0300966 | A1* | 10/2017 | Dereszynski | G06F 9/45504 |
| 2017/0323653 | A1* | 11/2017 | Hassan al Banna | G10L 21/0216 |
| 2018/0041536 | A1* | 2/2018 | Berlin | H04L 63/1416 |
| 2018/0204111 | A1* | 7/2018 | Zadeh | G06N 3/043 |
| 2018/0247107 | A1* | 8/2018 | Murthy | G06V 20/698 |
| 2019/0005686 | A1* | 1/2019 | Liu | G16H 30/40 |
| 2019/0139202 | A1* | 5/2019 | Mayer | G06V 10/764 |
| 2019/0379628 | A1 | 12/2019 | Liang et al. | |
| 2020/0065292 | A1 | 2/2020 | Li et al. | |
| 2021/0165963 | A1* | 6/2021 | Mendes | G06F 40/279 |

FOREIGN PATENT DOCUMENTS

| | | | | |
|---|---|---|---|---|
| CN | 108510083 | A * | 9/2018 | G06N 3/08 |
| DE | 102008014126 | A1 * | 10/2009 | G06N 3/049 |
| WO | 2020061578 | A1 | 3/2020 | |

OTHER PUBLICATIONS

"Noise Data in Data Mining", published on May 15, 2014 at https://sci2s.ugr.es/noisydata, retrieved Feb. 9, 2023. (Year: 2014).*
Yinan Li and Fang Liu, "Whiteout: Gaussian Adaptive Noise Injection Regularization in Deep Neural Networks", published in 2016 at https://arxiv.org, retrieved Feb. 9, 2023. (Year: 2016).*
Hyeonwoo Noh et al, "Regularizing Deep Neural Networks by Noise: Its Interpretation and Optimization", published at 31st Conference on Neural Information Processing Systems (NIPS 2017), Long Beach, CA, USA, retrieved Feb. 9, 2023. (Year: 2017).*
Abd-Krim Seghouana et al, "On learning feedforward neural networks with noise injection into inputs", published in Proceedings of the 12th IEEE Workshop on Neural Networks for Signal Processing, Switzerland, Sep. 6, 2002, retrieved Apr. 21, 2023. (Year: 2002).*
Jianping Hua et al, "Noise-injected neural networks show promise for use on small-sample expression data", published in BMC Bioinformatics 2006, 7:274, May 31, 2006, retrieved Apr. 21, 2023. (Year: 2006).*
Kam-Chuen Jim et al, "An Analysis of Noise in Recurrent Neural Networks: Convergence and Generalization", published in IEEE Transactions on Neural Networks, vol. 7, No. 6, Nov. 1996, retrieved Apr. 21, 2023. (Year: 1996).*
Yulei Jiang et al, "A Study of the Effect of Noise Injection on the Training of Artificial Neural Networks", published in Proceedings of International Joint Conference on Neural Networks, Atlanta, GA, USA, Jun. 14-19, 2009, retrieved Apr. 21, 2023. (Year: 2009).*
"Regularization—ML Glossary documentation", published Apr. 25, 2017 at https://ml-cheatsheet.readthedocs.io/en/latest/regularization.html, retrieved Apr. 21, 2023. (Year: 2017).*
Richard M. Zur et al, "Noise injection for training artificial neural networks: A comparison with weight decay and early stopping", published to Med. Phys. 36 (10), Oct. 2009, retrieved Aug. 1, 2023. (Year: 2009).*
Ciwan Ceylan, "Conditional Noise-Contrastive Estimation with Application to Natural Image Statistics", published in 2017 to https://kth.diva-portal.org/smash/get/diva2:1139156/FULLTEXT01.pdf, retrieved Mar. 22, 2024. (Year: 2017).*
Noah A. Smith etc., "Contrastive Estimation: Training Log-Linear Models on Unlabeled Data", published on Jul. 17, 2018 to https://www.cs.cmu.edu/~nasmith/papers/smith+eisner.acl05.pdf, retrieved Mar. 22, 2024. (Year: 2018).*
Jacob Goldberger etc., "Training Deep Neural-Networks Using a Noise Adaptation Layer", published in 2016 to https://openreview.net/pdf?id=H12GRgcxg, retrieved Mar. 22, 2024. (Year: 2016).*
"Loss Functions", published on Mar. 22, 2018 to https://ml-compiled.readthedocs.io/en/latest/loss_functions.html, retrieved Mar. 22, 2024. (Year: 2018).*
U.S. Appl. No. 16/525,148, Shu et al., filed Jul. 29, 2019.
U.S. Appl. No. 16/782,349, Beigi et al., filed Feb. 5, 2020.
Kingman, Poisson processes. Wiley Online Library, 1993.
Snyder, et al., Random point processes in time and space. Springer Science & Business Media, 2012.
Arjovsky, et al., Towards principled methods for training generative adversarial networks. arXiv preprint arXiv:1701.04862, 2017.
Bromley, et al., Signature verification using a "Siamese" time delay neural network. In Advances in Neural Information Processing Systems, pp. 737-744, 1994.
Du, et al., Recurrent marked temporal point processes: Embedding event history to vector. In Proceedings of the 22nd ACM SIGKDD International Conference on Knowledge Discovery and Data Mining, pp. 1555-1564. ACM, 2016.
Flanders, Differentiation under the integral sign. The American Mathematical Monthly, 80(6):615-627, 1973.
Gao, et al., Modeling and predicting retweeting dynamics on microblogging platforms. In Proceedings of the Eighth ACM International Conference on Web Search and Data Mining, pp. 107-116. ACM, 2015.
Glorot, et al., Understanding the difficulty of training deep feedforward neural networks. In Proceedings of the Thirteenth International Conference on Artificial Intelligence and Statistics, pp. 249-256, 2010.
Goodfellow, On distinguishability criteria for estimating generative models. arXiv preprint arXiv:1412.6515, 2014.
Guo, et al., A comparison of methods for cascade prediction. In Advances in Social Networks Analysis and Mining (ASONAM), 2016 IEEE/ACM International Conference on, pp. 591-598. IEEE, 2016.
Guo, R. et al., "INITIATOR: Noise-contrastive Estimation for Marked Temporal Point Process", Proceedings of the Twenty-Seventh International Joint Conference on Artificial Intelligence (IJCAI-18) (Stockholm, SE, Jul. 13-19, 2018), pp. 2191-2197.
Gutmann, et al., Noise-contrastive estimation: A new estimation principle for unnormalized statistical models. In Proceedings of the Thirteenth International Conference on Artificial Intelligence and Statistics, pp. 297-304, 2010.
Hawkes, Spectra of some self-exciting and mutually exciting point processes. Biometrika, 58(1):83-90, 1971.
Hochreiter, et al., Long short-term memory. Neural computation, 9(8):1735-1780, 1997.
Kingma, et al., Adam: A method for stochastic optimization. arXiv preprint arXiv:1412.6980, 2014.

(56) References Cited

OTHER PUBLICATIONS

Lian, et al., A multitask point process predictive model. In Proceedings of the 32nd International Conference on Machine Learning (ICML-15), pp. 2030-2038, 2015.

Liu, et al., On predictive patent valuation: Forecasting patent citations and their types. In AAAI, pp. 1438-1444, 2017.

Mei, The neural hawkes process: A neurally self-modulating multivariate point process. arXiv preprint arXiv:1612.09328, 2016.

Mikolov, et al., Distributed representations of words and phrases and their compositionality. In Advances in neural information processing systems, pp. 3111-3119, 2013.

Mnih, et al., A fast and simple algorithm for training neural probabilistic language models. In Proceedings of the 29th International Conference on International Conference on Machine Learning, pp. 419-426. Omnipress, 2012.

Rasmussen, Temporal point processes the conditional intensity function. Lecture Notes, Jan. 2011.

Shen, et al., Modeling and predicting popularity dynamics via reinforced poisson processes. In AAAI, vol. 14, pp. 291-297, 2014.

Tabibian, et al., Distilling information reliability and source trustworthiness from digital traces. In Proceedings of the 26th International Conference on World Wide Web, pp. 847-855. International World Wide Web Conferences Steering Committee, 2017.

Valera, et al., Modeling adoption and usage of competing products. In Data Mining (ICDM), 2015 IEEE International Conference, pp. 409-418. IEEE, 2015.

Xiao, et al., Modeling the intensity function of point process via recurrent neural networks. In AAAI, pp. 1597-1603, 2017.

Zhao, et al., Seismic: A self-exciting point process model for predicting tweet popularity. In Proceedings of the 21th ACM SIGKDD International Conference on Knowledge Discovery and Data Mining, pp. 1513-1522. ACM, 2015.

\* cited by examiner

SYSTEMS AND METHODS FOR SEQUENTIAL EVENT PREDICTION WITH NOISE-CONTRASTIVE ESTIMATION FOR MARKED TEMPORAL POINT PROCESS

CROSS REFERENCE TO RELATED APPLICATIONS

This is a U.S. non-provisional patent application that claims benefit to U.S. provisional patent application Ser. No. 62/697,880 filed on Jul. 13, 2018, which is incorporated by reference in its entirety.

FIELD

The present disclosure generally relates to marked temporal point processes, and in particular to systems and methods for noise-contrastive estimation of marked temporal point processes.

BACKGROUND

Figure 1A:
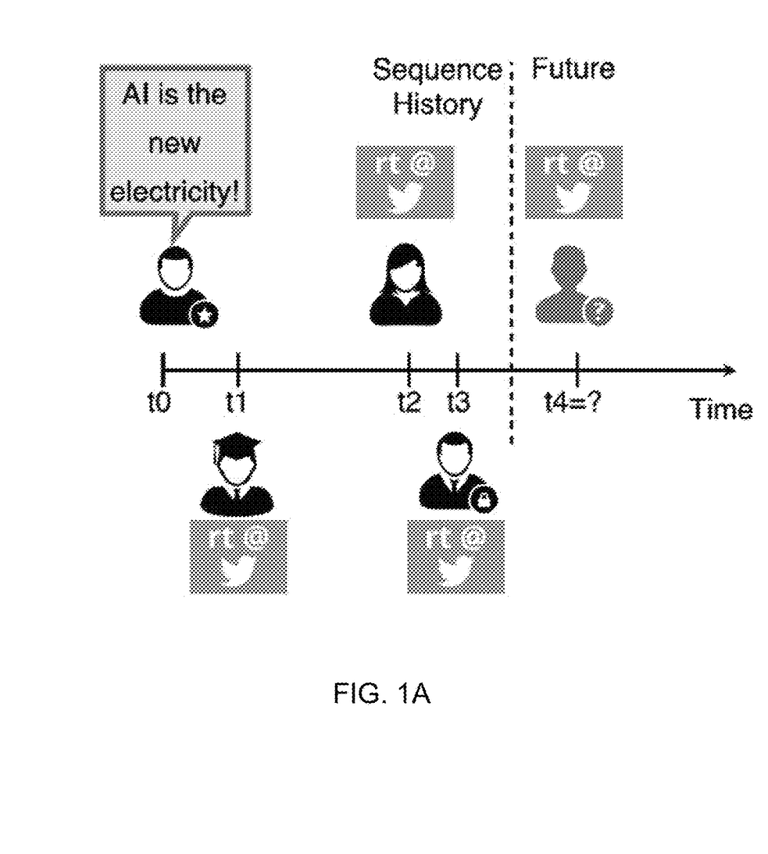
FIG. 1A is an illustration of a real-world example of sequential event data for retweet behaviors of a tweet and FIG. 1B is an illustration of a real-world example of sequential event data for usage patterns of a bike.
Figure 1B:
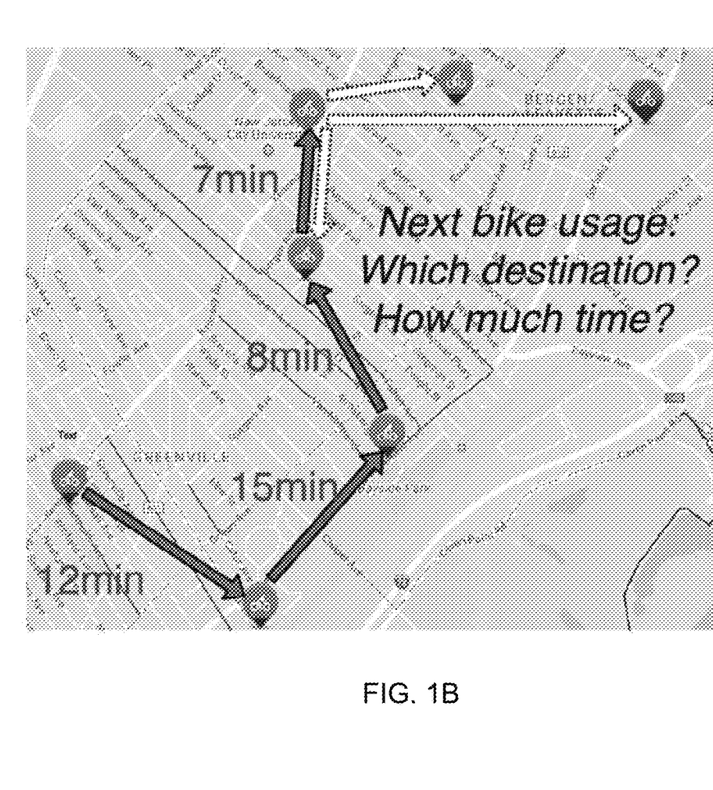
Figure 2:
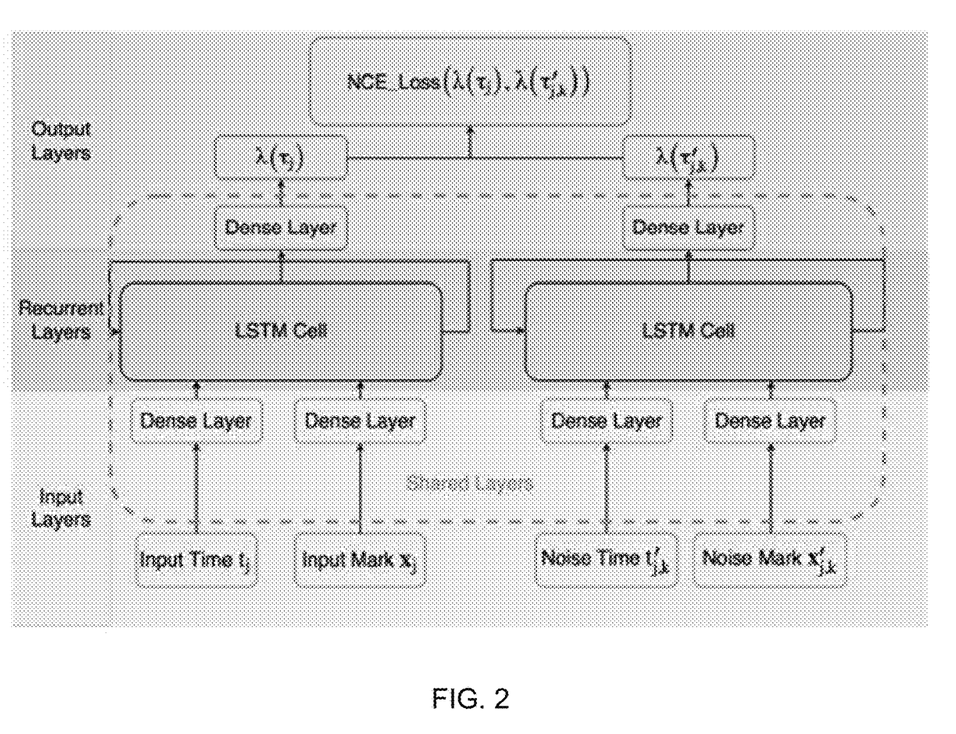
FIG. 2 is a simplified block diagram of an overview of a framework according to the present disclosure.
Figure 3A:
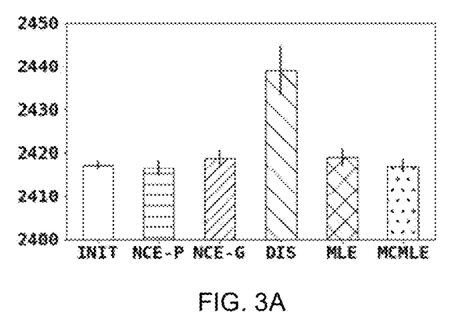
FIGS. 3A-3F are graphical representations of time prediction results of three datasets with error bars representing one standard deviation.
Figure 3B:
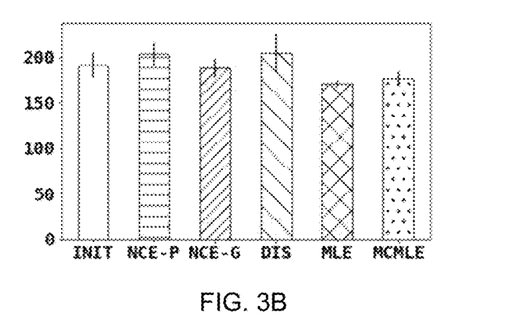
Figure 3C:
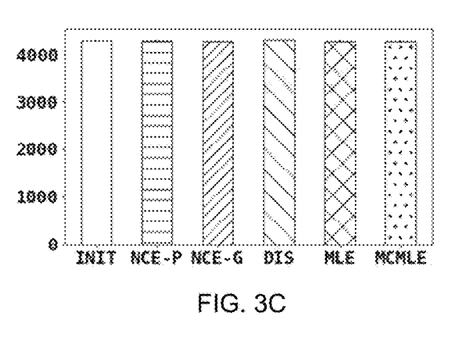
Figure 3D:
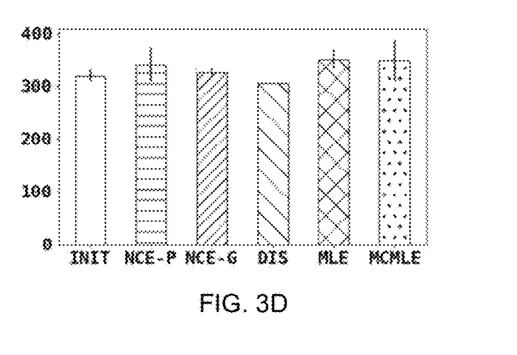
Figure 3E:
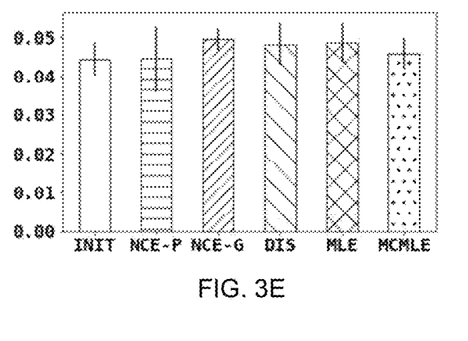
Figure 3F:
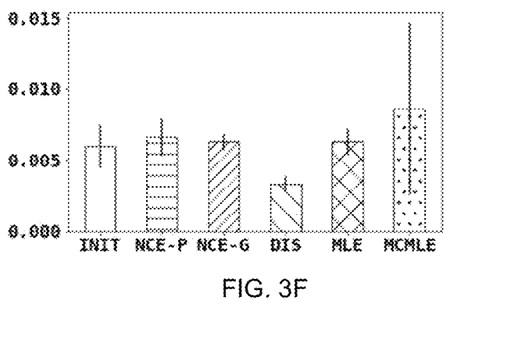
Figure 4A:
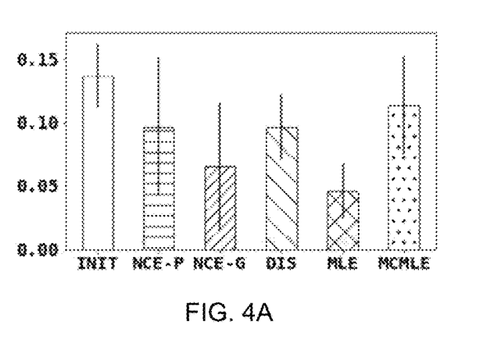
FIGS. 4A-4F are graphical representations of mark prediction results of three datasets with error bars representing one standard deviation.
Figure 4B:
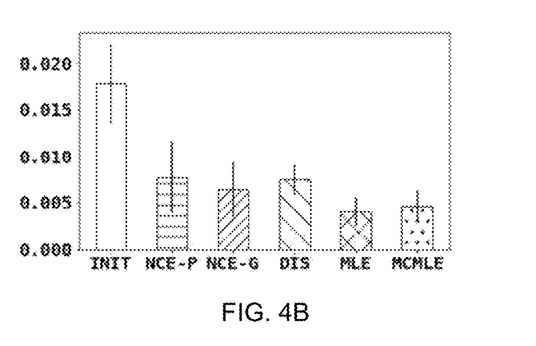
Figure 4C:
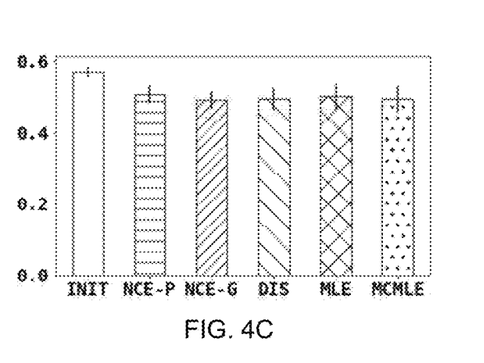
Figure 4D:
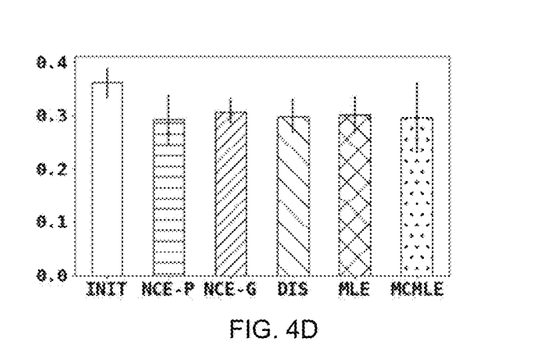
Figure 4E:
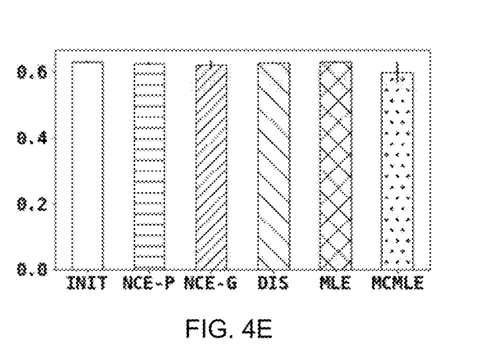
Figure 4F:
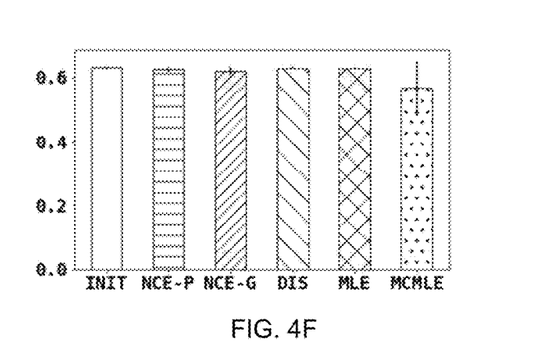

Recent years have witnessed a booming of sequential event data in a variety of high-impact domains, ranging from the streams of reposts in microblogging platforms to the usage records of a bike in bike sharing programs. More often than not, such data carries two sources of valuable information-the type (a.k.a. feature or mark) and the timing of the event. For example, as shown in FIG. 1A, given a sequence of retweets for the tweet "AI is the new electricity!" on Twitter, the event type refers to the category of users who retweet and can either be a celebrity or an average person, and the timing of the event refers to the detailed retweet timestamp in the timeline (e.g., $t_0$, $t_1$ . . . ). With the wide availability of sequential event data, one natural question to ask is: "given observed sequential events, can the exact timestamp of a particular event in the near future be predicted?" As in the case of bike usage sequence in FIG. 1B, we may want to know "when the given bike will arrive at which bike station soon"? This prediction task has significant implications in advancing a variety of real-world applications such as patient treatment suggestion, predictive maintenance and trending tweet prediction. To model such sequential data for downstream predictive tasks, a class of mathematical models called the marked temporal point process (MTPP) is often exploited. Given the time and feature of an event, these models jointly estimate how likely the event will happen in the near future by the conditional intensity function (CIF).

However, existing efforts are overwhelmingly devoted to the parameterization of MTPP models. Conventional studies on MTPP models are heavily focused on the design of CIF to effectively model both the event feature and the timing information. Recently, there has been a surge of research in developing RNN based MTPP models which aim to enhance the predictive power of MTPP through learning representations for event sequences. Despite empirical success in this research, little attention has been paid to the training process of MTPP models. The vast majority of existing work leverages Maximum Likelihood Estimation (MLE) to train MTPP models. However, the likelihood function of an MTPP model is often difficult to estimate because it has to be normalized by a definite integral of CIF which could be intractable to compute, especially for neural MTPP models. To alleviate this issue, existing approaches either: (1) limit CIF to integrable functions; or (2) approximate the likelihood with Monte Carlo sampling. Nonetheless, these two ways either leads to suboptimal specification of CIF or has to take the marginal distribution of event time as a priori. This is in addition to other problems of MLE such as mode dropping, which refers to the fact that MLE attempts to minimize the asymmetric KL divergence between the data distribution and the generative model. These issues inherently limit the usage of MLE for MTPP models in practice.

It is with these observations in mind, among others, that various aspects of the present disclosure were conceived and developed.

Corresponding reference characters indicate corresponding elements among the view of the drawings. The headings used in the figures do not limit the scope of the claims.

DETAILED DESCRIPTION

Recently, various recurrent neural network (RNN) models have been proposed to enhance the predictive power of mark temporal point processes. However, existing marked temporal point models are fundamentally based on the Maximum Likelihood Estimation (MLE) framework for the training, and inevitably suffer from the problem resulted from the intractable likelihood function. The present disclosure provides a technical solution to the aforementioned technical difficulties, in the form of a machine learning training framework based on noise-contrastive estimation. In one aspect, the novel training framework may be implemented to resolve the issue of intractable likelihood function in training of MTPP models.

Preliminaries

The background knowledge to facilitate the understanding of the MTPP models will now be discussed. First, the basic concepts of MTPP will be introduced and the notations noted herein summarized. Afterwards, the existing MLE training frameworks for marked temporal point process will be discussed.

Marked Temporal Point Process

The concepts of marked temporal point process (MTPP) with the retweet sequence example (FIG. 1A) will be explained for a better understanding. A sequence of M retweets $\tau = \{(t_1, \chi_1), \ldots, (t_i, \chi_i), \ldots, (t_M, \chi_M)\}$ is an instance of a marked temporal point process, where $(t_1, \ldots t_M) \in \mathbb{R}_{<o}^M$ refers to a strictly ascending sequence of timestamps, and $(\chi_1, \ldots, \chi_i, \ldots, \chi_M)$ is the corresponding sequence of d-dimensional marks (e.g., features of retweeters). The symbol $x^j$ denotes the domain of definition for $\chi_i^j$ i.e., the j-th dimension of mark $\chi_i$ ($\forall i=1, \ldots, M$; $j=1, \ldots, d$). Without loss of generality, the mark of event is treated as a continuous multidimensional variable $\chi$. For example, in a retweet sequence (FIG. 1A), the mark of an event indicates whether the retweeter is a celebrity or not, which naturally makes it a discrete and unidimensional variable. The notation $\tau=(t, \chi)$ denotes the random variables of an event, and ii with subscript denotes the i-th event ($t_i, \chi_i$).

Given a history of sequence until $t_i$, i.e., $\mathcal{H}_i=\{(t_1, \chi_1), \ldots (t_i, \chi_i)\}$, it can be characterized by the conditional intensity function (CIF) as follows:

$$\lambda(\tau|\mathcal{H}_i)=\mathbb{E}[N(t+dt,\chi|\mathcal{H}_i)-N(t,\chi|\mathcal{H}_i)], \quad (1)$$

wherein dt is an infinitesimal interval around t and N(t, $\chi$), indicates the number of events (e.g., retweets) with mark $\chi$ (e.g., user feature) in the sequence till t. For example, in FIG. 1A, CIF in Eq. (1) evaluates how likely the next retweet would be posted at timestamp t by a user with the feature $\chi$ by using the conditional intensity, which is a continuous un-normalized scalar. Using the chain rule, the CIF can be decomposed into two parts such that $\lambda(\tau=p(\chi|t)\lambda(t)$, where $p(\chi|t)$ is the conditional probability of the mark $\chi$ conditioned on the timestamp t. By setting $p=(\chi|t)=1$ ($\chi$ can only take one value), a typical unmarked temporal point process (TPP) can be used to model the conditional intensity $\lambda(t)$, and two of the most popular models are expressed as follows:

A homogeneous Poisson Process comes with the assumption that inter-event time intervals are i.i.d. samples from an exponential distribution. Thus, the CIF is a constant $$\lambda(t) = \frac{\mathbb{E}[\tilde{N}(t)]}{t},$$

where N(t) counts events.

A Hawkes Process has the following formulation of CIF $\lambda(t|\mathcal{H}_i)=\mu_o+\alpha\Sigma_{j=1}^{i}\phi(t,t_j)$, where $\phi(t, t_j)\geq$ denotes the self-exciting kernel and $\mu_0 \in \mathbb{R}$ is a parameter.

Maximum Likelihood Estimation for Marked Temporal Point Process

With the likelihood function defined, MLE is the most widely used estimator for TPP models. In particular, given the history sequence $\mathcal{H}_{i-1}$, the likelihood of observing the i-th event $\tau_i=(t_i, \chi_i)$, $t_i>t_{i-1}$ with the CIF $\lambda_\theta$ can be formulated as:

$$p_\theta(\tau_i|\mathcal{H}_{i-1})=\lambda_\theta(\tau_i)\exp(-\int_{\chi \in x}\int_{t_{i-1}}^{t_i}\lambda_\theta(\tau)dtd\chi). \quad (2)$$

Thus, the log likelihood function of observing a sequence of N events $\tau=(\tau_1, \tau_2, \ldots, \tau_N)$ at time $t_N$ can be written as:

$$\log p_\theta(\tau) = \sum_{i=1}^{N}\left[\log \lambda_\theta(\tau_i) - \int_{x \in X}\int_{t_{i-1}}^{t_i} \lambda_\theta(\tau)dtdx\right], \quad (3)$$

where $t_0=0$. By maximizing the above log likelihood, the estimated model parameters $\theta$ may be obtained. However, the normalizer $\int_{\chi \in x}\int_{t_{i-1}}^{t_i}\lambda_\theta(\tau)dtd\chi$ is a definite integral of CIF and can often be infeasible to compute, especially when neural networks are used to parameterize CIF.

Although approximation methods such as Monte Carlo sampling can be applied to compute the normalizer and its gradients, strong assumptions have to be made. For example, it has been conventionally assumed that the events of each sequence are uniformly distributed along the continuous time space. However, such assumptions may not always hold on real-world sequential event data. Hence, this provides motivation and a technical need to develop a novel training framework for complex MTPP models.

Marked Temporal Point Process Framework

The proposed marked temporal point process framework and the principle of noise-contrastive estimation will be discussed in greater detail. In addition, the strong connection between the framework with the exact MLE will be discussed as a strong connection with MLE is often desired by existing MTPP models, will be shown. Moreover, the training process of the framework will also be discussed including a novel adaptive noise generation algorithm. Finally, an instantiation of the framework with the state-of-the-art deep learning techniques in modeling sequential data will be introduced.

MTPP with Noise-Contrastive Estimation

In noise-contrastive estimation, parameters are learned by solving a binary classification problem where samples are classified into two classes, namely true sample or noise sample. Here, true and noise samples refer to the events observed in the data distribution $p_d$ and a specified noise distribution $p_n$, respectively. Thus, we define $p(y=1|\tau)$ to denote the probability that the event $\tau$ is a sample observed in $p_d$. Similarly, $p(y=0|\tau)$ denotes the probability that the event $\tau$ is not observed in the data but generated from the noise distribution $p_n$. Intuitively, the target is to maximize $p(y=1|\tau)$ and $p(y=0|\tau)$ for those observed events and generated noise, respectively. Hence, we obtain the following objective function is obtained:

$$\underset{\theta}{\mathrm{argmax}} \; \mathbb{E}_{\tau \sim p_d} \log p(y = 1 \mid \tau) + K\mathbb{E}_{\tau \sim p_n} \log p(y = 0 \mid \tau), \quad (4)$$

wherein K is the number of noise samples generated for each sample in the data. In MTPP, given the history sequence $\mathcal{H}_i$ and a random variable $\tau=(t, \chi)$, $t>t_i$, its posterior probability can be written as:

$$p(y = 1 \mid \tau; \mathcal{H}_i) = \frac{p_d(\tau)}{p_d(\tau) + Kp_n(\tau)}, \quad (5)$$

wherein $p_d(\tau)$ and $p_n(\tau)$ are short for $p_d(\tau|\mathcal{H}_i)$ and $p_n(\tau|\mathcal{H}_i)$, respectively. In detail, $p_d(\tau)$ denotes the probability of observing $\tau$ in the data. Similar to MLE, a family of parametric models $p_\theta(\tau)$ is used to approximate $p_d(\tau)$. Following the setting of NCE, instead of computing the normalizer as in Eq. (3), we could replace the normalizer by learning a function $z_{\theta_z}(\cdot)$ from the data. The re-parametrization and implementation of $z_{\theta_z}$ will be introduced later. The likelihood function of the framework is formulated as follows:

$$p_\theta(\tau)=\lambda_{\theta_\lambda}(\tau)\exp(z_{\theta_z}(\tau|\mathcal{H}_i)), \quad (6)$$

where $\theta=\{\theta_\lambda, \theta_z\}$ is the model parameter of the framework. It should be mentioned that directly maximizing the likelihood function in Eq. (6) over the data distribution leads to trivial solutions when the normalizer $z_{\theta_z} \to -\infty$. With $p_\theta$ defined, Eq. (4) can be reformulated as:

$$\mathcal{L}(\theta \mid \mathcal{H}_i) = \tag{7}$$

$$-\mathbb{E}_{\tau \sim p_d(\tau)}\left[\log \frac{p_\theta(\tau)}{p_\theta(\tau) + Kp_n(\tau)}\right] - K\mathbb{E}_{\tau \sim p_n(\tau)}\left[\log \frac{p_n(\tau)}{p_\theta(\tau) + Kp_n(\tau)}\right].$$

Given the j-th element of $\theta$ as $\theta_j$, the partial gradient of Eq. (7) against $\theta_j$ is:

$$\frac{\partial \mathcal{L}(\theta)}{\partial \theta_j} = -\mathbb{E}_{\tau \sim p_d(\tau)}\left[\frac{Kp_n(\tau)}{p_\theta(\tau) + Kp_n(\tau)} \times \frac{\partial \log p_\theta(\tau)}{\partial \theta_j}\right] + \tag{8}$$

$$K\mathbb{E}_{\tau \sim p_n(\tau)}\left[\frac{p_\theta(\tau)}{p_\theta(\tau) + Kp_n(\tau)} \times \frac{\partial \log p_\theta(\tau)}{\partial \theta_j}\right].$$

Then it is natural to ask if there are connections between the framework and the existing training framework based on MLE. In the following theorem, it is shown that they are inherently connected by the partial gradients. Theorem 1. The partial gradients of the loss function of framework (Eq. (8)) converge to those under the MLE framework as the number of noise samples per true sample $K \to +\infty$, with the following two mild assumptions: (1) the gradient $\nabla_\theta p_\theta$ exists for all $\theta$; (2) there exists an integrable function $R(\tau)$ which is the upper bound of $\max_j$ $$\left|\frac{\partial p_\theta(\tau)}{\partial \theta_j}\right|$$

Proof. Given $\mathcal{H}_i$ and $\tau = (t, \chi)$, $t > t_i$, the definition of expectation $\mathbb{E}_{\tau \sim p}[f(\tau)] = \int_{\chi \in \mathcal{X}} \int_{t_i}^{+\infty} p(\tau)f(\tau)dtd\chi$ is used to expand Eq. (8) as:

$$\frac{\partial \mathcal{L}(\theta)}{\partial \theta_j} = \int_X \int_{t_i}^{+\infty} \frac{Kp_n(\tau)(p_d(\tau) - p_\theta(\tau))}{p_\theta(\tau) + Kp_n(\tau)} \frac{\partial \log p_\theta(\tau)}{\partial \theta_j} dtdx. \tag{9}$$

When $K \to +\infty$, we have $$\frac{Kp_n(\tau)}{p_\theta(\tau) + Kp_n(\tau)} = 1,$$

thus:

$$\lim_{K \to +\infty} \frac{\partial \mathcal{L}(\theta)}{\partial \theta_j} = \int_X \int_{t_i}^{+\infty} (p_d(\tau) - p_\theta(\tau)) \frac{\partial \log p_\theta(\tau)}{\partial \theta_j} dtdx. \tag{10}$$

Then the second term of in Eq. (10) is shown to vanish for all j as $$p_\theta(\tau) \frac{\partial \log p_\theta(\tau)}{\partial \theta_j} = \tag{11}$$

$$\frac{\partial p_\theta(\tau)}{\partial \theta_j} : \int_X \int_{t_i}^{+\infty} \frac{\partial p_\theta(\tau)}{\partial \theta_j} dtdx = \frac{\partial \int_X \int_{t_i}^{+\infty} p_\theta(\tau)dtdx}{\partial \theta_j} = \frac{\partial 1}{\partial \theta_j} = 0.$$

Wherein, the Leibniz Rule is used to swap the order of partial derivation and integral. Moreover, it is known that $\int_{\chi \in \mathcal{X}} \int_{t_i}^{+\infty} p_\theta(\tau)dtd\chi = 1$ because the likelihood $p_\theta(\tau)$ is a well-defined probability density function. Therefore, in Eq. (10) what is left is:

$$\lim_{K \to \infty} \frac{\partial \mathcal{L}(\theta)}{\partial \theta_j} = \int_X \int_{t_i}^{+\infty} p_d(\tau) \frac{\partial \log p_\theta(\tau)}{\partial \theta_j} dtdx \tag{12}$$

$$= \mathbb{E}_{\tau \sim p_d}\left[\frac{\partial \log p_\theta(\tau)}{\partial \theta_j}\right],$$

which is equivalent to the expectation of the gradient of MLE over the data distribution. This completes the proof.

Therefore, with a reasonable K and a proper $p_n$, reducing the objective of exact MLE (Eq. (5)) to that of the framework, namely Eq. (7), does not significantly affect the gradients for model parameters $\theta$ in the learning process.

Next, a re-parametrization trick is introduced for the framework which can also be adapted to other NCE frameworks. With this trick, the strong assumptions of negative sampling are avoided: (1) $p_n$ is independent of the history $\mathcal{H}$ (2) $p_n$ is a uniform distribution s.t. $Kp_n = 1$. Specifically, Eq. (4) can be rewritten as follows with $$z' = z'(\tau \mid \mathcal{H}_i) = \frac{\exp(z_{\theta_z})}{Kp_n(\tau)} : \operatorname*{argmin}_\theta \mathcal{L}(\theta) - \tag{13}$$

$$\sum_\tau \sum_{j=1}^{i-1}\left[\log \frac{\lambda_{\theta_\lambda}(\tau_j)z'}{\lambda_{\theta_\lambda}(\tau_j)z' + 1} + \sum_{k=1}^K \log \frac{1}{\lambda_{\theta_\lambda}(T'_{j,k})z' + 1}\right].$$

With the aforementioned re-parametrization trick, it can be directly learned z' instead of $z_{\theta_z}$. Thus, $p_n(\tau)$ does not need to be explicitly computed, which enables us to sidestep the constraint that $p_n$ requires an analytical expression, which further expands the functional space to enable the search for the optima noise distribution $p_n$.

Adaptive Noise Sample Generation

The framework enables the training of complex MTPP models with the principle of NCE. Nonetheless, the development of a sophisticated noise sample generation algorithm is still in its infancy. A novel algorithm for adaptive noise sample generation is discussed herein. The algorithm facilitates the training process of the framework where at least one noise event $\tau_{i,k}$ has to be generated for an observed event $\tau_i$. As $p_d$ is a continuous joint distribution of time t and mark x, it is much more challenging to work out an intuitive $p_n$ than the case of neural language models where $p_n$ can be a simple univariate deterministic function of word frequency. It has been previously argued that $p_n$ should be close to $p_d$ because the more difficult the classification problem in Eq. (1) is, the more information model $p_\theta$ can be captured from the data distribution $p_d$. Without arbitrary assumptions on $p_n$, a principled way is proposed for adaptive noise generation. The algorithm adaptively pushes the implicit noise distribution $p_n$ towards as $p_\theta$ catches more information from $p_d$.

The key intuition of this algorithm is that, in the l-th iteration of the training process, the current MTPP model $p_\theta$ may not be good enough, so it can be used it to generate noise samples:

$$t'_{i+1,k} - \hat{t}_{i+1} \sim \mathcal{N}(0, l\sigma_0^2), \chi'_{i+1,k} = \hat{\chi}_{i+1}, \tag{14}$$

where $\hat{t}_{i+1}$ and $\hat{\chi}_{i+1}$ are the predicted time and mark for the i+1-th event based on $\mathcal{H}_i$ and $p_\theta$. For example, in conventional MTPP models, S examples can be sampled by ---
Algorithm 1 Adaptive noise generation for INITIATOR.
---
Input: $\mathcal{H}_i$, $p_\theta$
1: Compute prediction $\hat{\tau}_{i+1} = (\hat{t}_{i+1}, \hat{x}_{i+1})$
2: for k = 1 to K do
3:    Sample $\tau'_{i+1, k}$ by Eq. (14)
4: end for
5: return $(\tau'_{i+1, 1}, ..., \tau'_{i+1, K})$
---

$\hat{\tau}_{i+1,j} = (\hat{t}_{i+1,j}, \hat{\chi}_{i+1,j}) \sim p_\theta(\tau | \mathcal{H}_i)$, $j=1, \ldots, S$ and make predictions by estimating expectations:

$$\hat{t}_{i+1} = \mathbb{E}[t_{i+1}] = \frac{1}{S}\sum_j \hat{t}_{i+1,j} \text{ and } \hat{x}_{i+1} = \mathbb{E}[x_{i+1}] = \frac{1}{S}\sum_j \hat{x}_{i+1,j}.$$

It is discussed herein how the predictions can be made with neural MTPP models. The adaptive Gaussian noise is added to ensure that good predictions are not treated as noise samples. The variance increases with respect to the iteration number M because the model $p_\theta$ makes better predictions as the training process continues.

A Neural MTPP Model Based on the Framework

As discussed herein, an instantiation of the framework has been introduced with the state-of-the-art deep learning models (a.k.a. neural MTPP). Compared with conventional models, neural MTPP models handle sequential event data by vector representations. Specifically, a neural MTPP model maps the observed history of a sequence $\mathcal{H}_i$ to vector representation $h_i$. In the designed model, dense layers are used to project the raw input into a multi-dimensional space. Then, Long Short Term Memory (LSTM) is used to capture the nonlinear dependencies between $\tau_i$ and $\mathcal{H}_{i-1}$, $i=2, \ldots$, N. Consequently, the output of LSTM is regarded as the vector representation. Given input event $\tau_i$ and the corresponding noise samples $\tau_{i,k}^j = 1, \ldots, K$, the neural MTPP model is formulated set forth as below:

$$s_i[\phi_t(w_i t_i + b_t), \phi_\chi(W_x x_i + b_\chi)](h_i, c_i) = \text{LSTM}(s_i, h_{i-1}, c_{i-1}). \quad (15)$$

To train this model, an output model is required to map $h_i$ to a scalar y which can be the conditional intensity $\lambda^t(t_i | \mathcal{H}_{i-1})$, the ground conditional intensity $\lambda(\tau_i | \mathcal{H}_{i-1})$, the predicted time $\hat{t}_{i+1}$ or the predicted mark $\chi_{i+1}$. Hence, the CIF of a neural MTPP model can be decomposed as $\lambda_{\theta_\lambda}(\tau | \mathcal{H}_{i-1}) = g^\lambda(f(\mathcal{H}_i))$. In the designed model, a dense layer performs the function of an output model $g^\lambda$, mapping vector representation to conditional intensity. Then the output model can be framed as:

$$\lambda(\tau_i) = g^\lambda(h_i) = \phi_{out}(w_{out} h_i + b_{out}) \quad (16)$$

To compute the loss function of the framework, similar to the Siamese structure, dense layers and recurrent layers are shared between inputs—observed event $\tau_i$ and its noise $\tau'_{i,k}$. Finally, the conditional intensity of a true event $\lambda(\tau_i)$ and that for its noise samples $\lambda(\tau'_{i,k})$ may be fed into the loss function of the framework (Eq. (13)).

Then, how adaptive noise generation is employed will be discussed. According to Algorithm 1, given the vector representation $h_i$ and output models $g^t$, $g^x = [g^{x^1}, \ldots, g^{x^4}]$ trained to predict the i+1-th event based on a noise sample $\tau'_{i+1,k}$ is generated by:

$$t'_{i+1,k} \sim g^t(h_i) + \mathcal{N}(0, m\sigma_0^2), \chi'_{i+1,k} = g^\chi(h_i). \quad (17)$$

Computing Device

Figure 5:
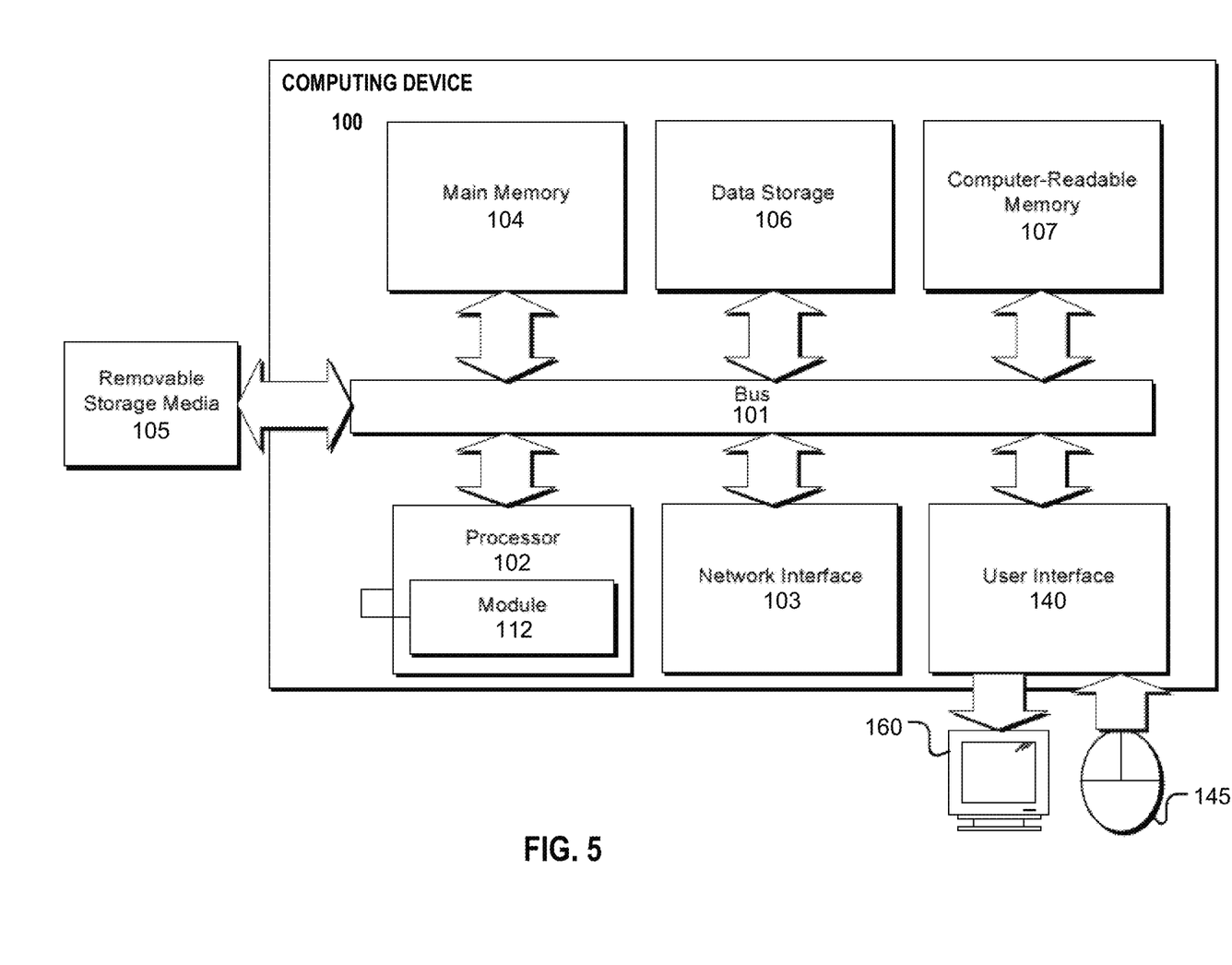
FIG. 5 is an example schematic diagram of a computing system that may implement various methodologies of the proposed marked temporal point process framework.

FIG. 5 illustrates an example of a suitable computing device 100 which may be used to implement various aspects of the MTTP framework with adaptive noise sample generation described herein. More particularly, in some embodiments, aspects of the MTTP framework with adaptive noise sample generation may be translated to software or machine-level code, which may be installed to and/or executed by the computing device 100 such that the computing device 100 is configured to train one or more MTTP models to better estimate how likely it is that an event will occur in the future. It is contemplated that the computing device 100 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 100 may include various hardware components, such as a processor 102, a main memory 104 (e.g., a system memory), and a system bus 101 that couples various components of the computing device 100 to the processor 102. The system bus 101 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 100 may further include a variety of memory devices and computer-readable media 107 that includes removable/non-removable media and volatile/non-volatile media and/or tangible media, but excludes transitory propagated signals. Computer-readable media 107 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 104 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 102. Further, a data storage 106 stores an operating system, application programs, and other program modules and program data.

The data storage 106 may also include other removable/non-removable, volatile/nonvolatile computer storage media. For example, data storage 106 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 100.

A user may enter commands and information through a user interface 140 (displayed via a monitor 160) by engaging input devices 145 such as a tablet, electronic digitizer, a microphone, keyboard, and/or pointing device, commonly referred to as mouse, trackball or touch pad. Other input devices 145 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 145 are in operative connection to the processor 102 and may be coupled to the system bus 101, but may be connected by other interface and bus structures, such as a parallel port, game port or a universal serial bus (USB). A monitor 160 or other type of display device is also connected to the system bus 101. The monitor 160 may also be integrated with a touch-screen panel or the like.

The computing device 100 may be implemented in a networked or cloud-computing environment using logical connections of a network interface 103 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 100 may be connected to a public and/or private network through the network interface 103. In such embodiments, a modem or other means for establishing communications over the network is connected to the system bus 101 via the network interface 103 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

Computing System

Figure 6:
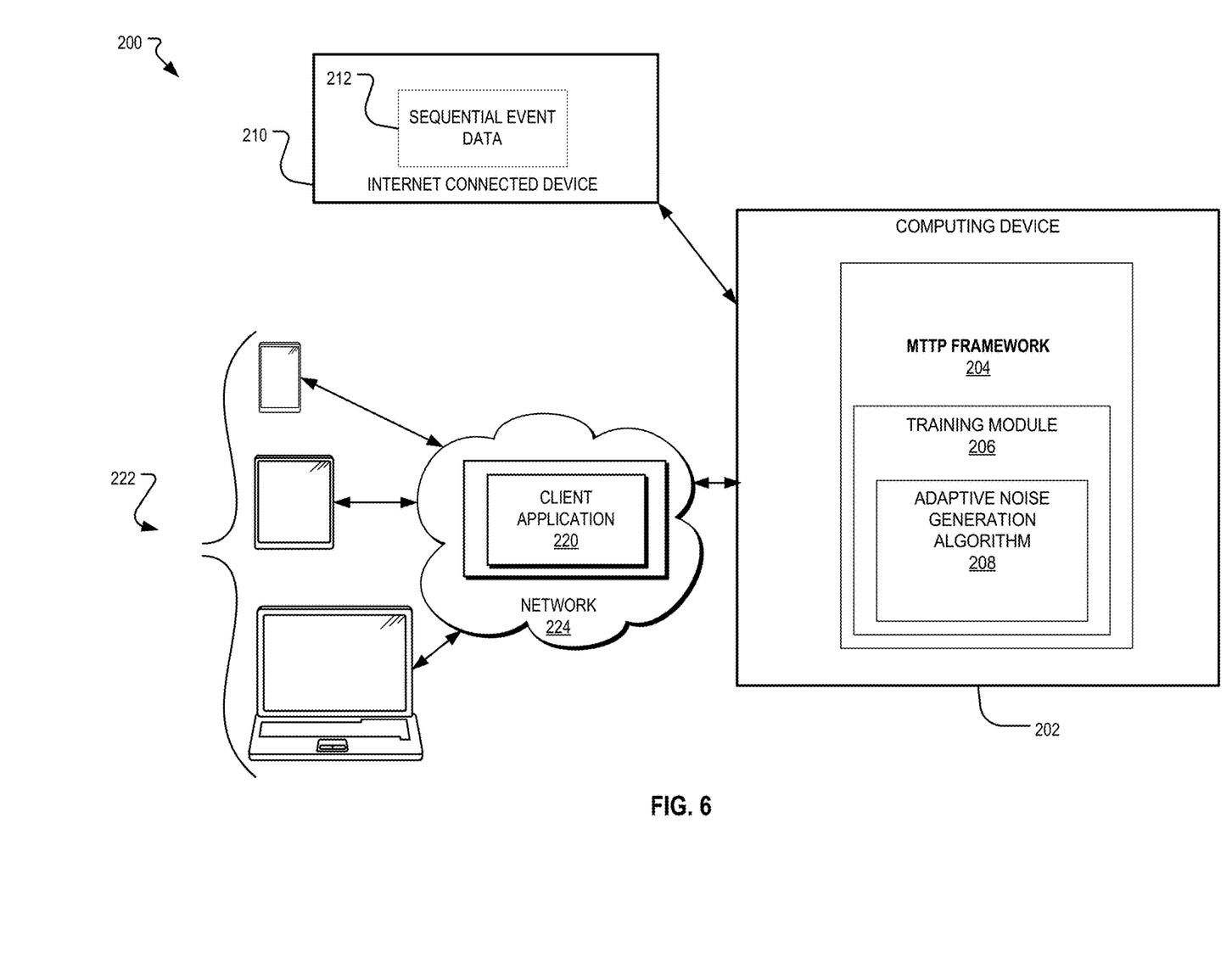
FIG. 6 is a simplified block diagram illustrating an exemplary network/system embodiment of the MTTP framework for training models with adaptive noise sample generation as described herein.

Referring to FIG. 6, in some embodiments the MTTP framework with adaptive noise generation described herein may be implemented at least in part by way of a computing system 200. In general, the computing system 200 may include a plurality of components, and may include at least one computing device 202, which may be equipped with at least one or more of the features of the computing device 100 described herein. As indicated, the computing device 202 may be configured to implement an MTTP framework 204 which may include a training module 206 for training one or more MTTP models and an adaptive noise sample generation algorithm 208 to facilitate the training. Aspects of the MTTP framework 204 may be implemented as code and/or machine-executable instructions executable by the computing device 202 that may represent one or more of a procedure, a function, a subprogram, a program, a routine, a subroutine, a module, a software package, a class, or any combination of instructions, data structures, or program statements related to the above MTTP model training methods. A code segment of the MTTP framework 204 may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In other words, aspects of the MTTP framework may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium, and a processor(s) associated with the computing device 202 may perform the tasks defined by the code.

As further shown, the system 200 may include at least one internet connected device 210 in operable communication with the computing device 202. In some embodiments, the internet connected device may provide sequential event data 212 to the computing device 202 for training purposes or real world prediction of future events. The internet connected device 210 may include any electronic device capable of accessing/tracking sequential event data such as social media activity over time. In addition, the system 200 may include a client application 220 which may be configured to provide aspects of the MTTP framework 204 to any number of client devices 222 via a network 224, such as the Internet, a local area network, a wide area network, a cloud environment, and the like.

Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 112. Such modules 112 are hardware-implemented, and thus include at least one tangible unit capable of performing certain operations and may be configured or arranged in a certain manner. For example, a hardware-implemented module 112 may comprise dedicated circuitry that is permanently configured (e.g., as a special-purpose processor, such as a field-programmable gate array (FPGA) or an application-specific integrated circuit (ASIC)) to perform certain operations. A hardware-implemented module 112 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 112 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 112 are temporarily configured (e.g., programmed), each of the hardware-implemented modules 112 need not be configured or instantiated at any one instance in time. For example, where the hardware-implemented modules 112 comprise a general-purpose processor configured using software, the general-purpose processor may be configured as respective different hardware-implemented modules 112 at different times. Software may accordingly configure a processor 102, for example, to constitute a particular hardware-implemented module at one instance of time and to constitute a different hardware-implemented module 112 at a different instance of time.

Hardware-implemented modules 112 may provide information to, and/or receive information from, other hardware-implemented modules 112. Accordingly, the described hardware-implemented modules 112 may be regarded as being communicatively coupled. Where multiple of such hardware-implemented modules 112 exist contemporaneously, communications may be achieved through signal transmission (e.g., over appropriate circuits and buses) that connect the hardware-implemented modules. In embodiments in which multiple hardware-implemented modules 112 are configured or instantiated at different times, communications between such hardware-implemented modules may be achieved, for example, through the storage and retrieval of information in memory structures to which the multiple hardware-implemented modules 112 have access. For example, one hardware-implemented module 112 may perform an operation, and may store the output of that operation in a memory device to which it is communicatively coupled. A further hardware-implemented module 112 may then, at a later time, access the memory device to retrieve and process the stored output. Hardware-implemented modules 112 may also initiate communications with input or output devices.

Experiments

As discussed herein, experiments were conducted to evaluate the performance of the framework. In particular, an attempt was made to answer the following two research questions: (1) how accurate can the framework predict the exact timestamp of the event; and (2) what type of event may occur in the near future. Before the details of experiments, the datasets and experimental settings are introduced.

Dataset Description

Three real-world sequential event datasets were collected to answer the above two proposed research questions.

Citi Bike

Citi Bike shares bikes at stations across New York and New Jersey. The activities for a certain bike form a sequence of events. The training set and test set contain the records of the bikes in Jersey City from January to August 2017 and that of September 2017, respectively. Our task is to predict destination of the next ride and its arrival time.

Retweet 10,000 retweet streams were randomly from the Seimic dataset and perform a 5-fold cross-validation. Each stream of retweets for a novel tweet is a sequence of events. The task is to predict the retweet time and the associated class label.

Financial

This dataset contains sequences of financial events from a stock traded in US. To avoid bias in the original dataset, we ensure the length of sequences to be the same by using the first 800 events of each sequence. Then a 5-fold cross-validation is carried out. The task is to predict time and mark (buy or sell) for the next event.

In these datasets, each event only comes with a discrete unidimensional mark. These statistics are shown in Table 1: mean and standard deviation of time interval between consecutive events ($\mu_t$ and $\sigma_t$), the number of unique values for a mark ($|X|$), average sequence lengths ($\mu_M$) and the number of events for training and test.

TABLE 1

Statistics of ths datasets

| Dataset | Citi Bike | Retweet | Financial |
|---|---|---|---|
| $\mu_t$ | 8.135e2(s) | 3.228e4(s) | 0.619(ms) |
| $\sigma_t$ | 1.157e4(s) | 7.839e4(s) | 3.117(ms) |
| $|X|$ | 132 | 3 | 2 |
| $\mu M$ | 1.839e2 | 1.458e2 | 8.00e2 |
| training events | 3.299e5 | 1.468e6 | 6.400e5 |
| test events | 3.299e4 | 3.716e5 | 1.600e5 |

Experimental Settings

Training is carried out with mini-batches while experimental results of the whole test set are reported. All experiments are repeated 10 times. ADAM is the optimizer we use. In addition, ReLU was selected as the activation function ($\phi_t$, $\phi_\chi$ and $\phi_{out}$). In terms of the initialization, the cell state of LSTM, weights of LSTM and weights of dense layers are set to be 0, the truncated normal distribution and the Xavier initialization, respectively. Grid search is used for optimal hyperparameters. Specifically, learning rate was searched in {0.01, 0.001, 0.0001}, number of units in dense layers in {1, 10, 100}, LSTM state cell size in {32, 64, 128, 256}, batch size in {16, 32, 64} and the number of noise samples per true event in {1, 2, 5, 10}. Three strategies were adopted for the re-parametrized normalizer z': (1) z'=1 was set as constant; (2) z' was set as a single parameter to learn, which is also independent of $\mathcal{H}_i$; (3) it was learned that $z'=g^z(h_i)$ as a function of the vector representation of $\mathcal{H}_i$.

Baselines

To assess the effectiveness of the framework, the framework was compared with the following variants and state-of-the-art frameworks for training neural MTPP models. For a fair comparison, we use the same input layers, recurrent layers and output layers on vector representations for time, mark, CIF, and ground CIF. It is worthwhile to note that TPP models such as seismic cannot be considered as baselines as their inability to model mark types along with timing information.

NCE-P: A variant of framework in which we sample $t'_{i,k}$ from homogeneous Poisson process.

NCE-G: A modified of the framework in which $t'_{i,k}$ are samples from Gaussian distributions.

DIS: DIS trains a MTPP model with discriminative loss functions, i.e.,

MSE on time and cross entropy on marks.

MLE: With an integrable ground CIF, MLE maximizes the likelihood of time exactly and minimizes the cross entropy on marks.

MCMLE: MCMLE trains a MTPP model by maximizing likelihood approximately through Monte Carlo sampling.

Evaluation Metrics:

For time prediction, we evaluate different methods by the root mean squared error (RMSE) and the mean absolute error (MAE), which are widely adopted to measure the performance of regression algorithms. For mark prediction, as we only have unidimensional discrete marks in the datasets, the performance is measured through two widely used metrics for classification: micro-F1 and macro-F1.

Experimental Results and Discussion

Experiments were conducted with the three aforementioned datasets on two research tasks: (1) time prediction; and (2) mark prediction. The comparison results w.r.t. the time prediction are shown in FIGS. 3A-3F and the results with respect to the mark prediction are presented in FIGS. 4A-4F.

The following observations from these figures:

In nearly all cases, the proposed training framework outperformed its variants and the state-of-the-art approaches for both prediction tasks measured by the four metrics. One-tailed T-test was conducted to compare the performance of the framework and other methods. T-test results indicate that framework is significantly better than the baselines with a significant level of 0.05.

Benefiting from the adaptive noise generation, the framework performed better than NCE-P and NCE-G as the noise samples generated by INITIATOR forces the MTPP model to capture more from the data distribution.

The framework outperformed MLE in most of the cases as MLE specifies an integrable function as its ground CIF, which limits the functional space MLE can search.

Results show that the framework is better than MCMLE. This is because Monte Carlo sampling can lead to biased estimations of the likelihood function, while Theorem 1 shows that INITIATOR estimates the likelihood in a more principled way.

For time prediction over these datasets, RMSE is much larger than MAE as the values of σt for the datasets are large w.r.t. the values of $\mu_t$ and RMSE penalizes large errors much more than MAE does.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method of improving the training of marked temporal point process models, comprising
utilizing a processor in communication with a tangible storage medium storing instructions that are executed by the processor to perform operations comprising:
accessing a model that expresses sequential events using a marked temporal point process, the model configured to formulate a prediction of a future event and associated future event characteristics based on sequential event data applied to the model;
training the model, by:
identifying event samples $P^d$ from a data distribution and initial noise samples $P^n$ from a noise distribution associated with the model,
generating additional noise samples from the noise distribution, by
computing values for a predicted time and a predicted mark by using as inputs at least a history sequence $\mathcal{H}_i$ and a parametric model $p_\theta$;
generating, iteratively, a noise sample using the noise distribution and inputting at least a predicted time t and predicted mark x, and
adding an additional noise to the noise sample, wherein the additional noise is sampled from a second noise distribution with a variance, wherein a value of the variance associated with the second noise distribution increases with respect to a number of iterations, and
utilizing the event samples, the additional noise samples, and a noise contrastive loss function to re-parameterize the model; and
updating the noise distribution to become increasingly similar to the data distribution the model accesses more information from the data distribution to make classification between the noise samples and the event samples increasingly difficult for the model to learn.

2. The method of claim 1, wherein the probability density function outputs an adaptive Gaussian noise distribution.

3. The method of claim 1, wherein a neural deep learning model maps an observed history of the history sequence $\mathcal{H}_i$ to a vector representation $\mathcal{H}_i$.

4. The method of claim 1, wherein the event samples $p_d$ are continuous joint distributions of a time value t and predicted mark x.

5. The method of claim 1, further comprising generating at least one noise event for an observed event.

6. The method of claim 1, wherein a plurality of dense layers are applied to project a raw input into a multidimensional space.

7. A processor, configured to:
access a model that expresses sequential events using a marked temporal point process, the model configured to formulate a prediction of a future event and associated future event characteristics based on sequential event data applied to the model;
train the model using adaptive noise sample generation, by:

identifying event samples $p_d$ from a data distribution and initial noise samples $p_n$ from a noise distribution associated with the model, generating additional noise samples from the noise distribution, by computing values for a predicted time and a predicted mark by using as inputs at least a history sequence $\mathcal{H}_i$ and a parametric model $p_\theta$; and generating, iteratively, a noise sample using the noise distribution and inputting at least a predicted time t and predicted mark x, adding an additional noise to the noise sample, wherein the additional noise is sampled from a second noise distribution with a variance, wherein a value of the variance associated with the second noise distribution increases with respect to a number of iterations, and utilizing the event samples, the additional noise samples, and a noise contrastive loss function to re-parameterize the model to adaptively push noise distribution associated with $p_n$ towards $p_d$ as the model accesses more information from the data distribution.

8. The processor of claim 7, wherein the probability density function outputs an adaptive Gaussian noise distribution.

9. The processor of claim 7, further configured to employ a neural deep learning model that maps an observed history of the history sequence $\mathcal{H}_i$ to a vector representation $h_i$.

10. The processor of claim 7, wherein the event samples $p_d$ are continuous joint distributions of a time value t and predicted mark x.

11. The processor of claim 7, further configured to generate at least one noise event for an observed event.

12. The processor of claim 7, further configured to apply a plurality of dense layers to project a raw input into a multi-dimensional space.

13. A processor, configured to:

access sequential event data; and formulate, by execution of a model in view of the sequential event data, a prediction of a future event and associated future event characteristics, the model configured to express sequential events using a marked temporal point process, the model configured for noise-contrastive estimation wherein true and noise samples refer to events observed in a data distribution pa and a specified noise distribution $p_n$, wherein the model is trained using adaptive noise sample generation to make the noise distribution as close as possible to the data distribution so that the model learns to discriminate better by solving more difficult classification problems.

14. The processor of claim 13, wherein the model is trained using the adaptive noise sample generation by identifying event samples $p_d$ from the data distribution and initial noise samples $p_n$ from the noise distribution associated with the model, generating additional noise samples from the noise distribution, and utilizing the event samples, the additional noise samples, and a noise contrastive loss function to re-parameterize the model to adaptively push noise distribution associated with $p_n$ towards $p_d$ as the model accesses more information from the data distribution.

15. The processor of claim 13, wherein the model is a recurrent neural network (RNN).

* * * * *